United States Patent Office 3,232,935
Patented Feb. 1, 1966

3,232,935
4-HALOISOTHIAZOLO[4,5,d]-3-ISOTHIAZOLESUL-FENYL HALIDES AND SULFENAMIDES
William R. Hatchard, Wilmington, Del., assignor to E. I. du Pont de Nemours and Company, Wilmington, Del., a corporation of Delaware
No Drawing. Filed Apr. 30, 1962, Ser. No. 191,309
7 Claims. (Cl. 260—247.1)

This invention relates to new heterocyclic compounds containing the isothiazole structure and to their preparation.

Compounds containing the isothiazole structure

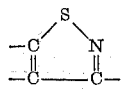

have been unknown until recently except in the form of bicyclic compounds where the isothiazole nucleus is fused to a benzene nucleus, i.e., benzoisothiazoles. Isothiazoles wherein the ring carbon atoms bear monovalent substituents were first reported in 1956 by Adams and Slack (Chemistry and Industry, 1956, 1232). Compounds containing two fused isothiazole rings, i.e., isothiazoloisothiazoles, have been wholly unknown heretofore, as have compounds where the isothiazole ring bears sulfenyl halide or sulfenamide substituents.

The new compounds provided by this invention are of the formula (I) 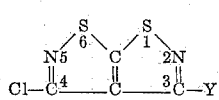

(the ring atoms are numbered in the above formula for easier reference) where Y is the sulfenyl chloride group, —SCl, or a sulfenamido group,

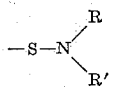

each of R and R', taken individually, is hydrogen, alkyl or cycloalkyl, and R and R' can together form a divalent radical (—R—R'—) which is an alkylene group of 2–6 chain carbons which bear a total of up to 2 (0–2) alkyl substituents of 1–2 carbons, 3-Q-1,5-pentylene, or substituted 3-Q-1,5-pentylene wherein the substituents, which are 1–2 alkyl groups of 1–2 carbons, are bonded to carbon, Q being a chalcogen of atomic number 8–16, i.e., oxygen or sulfur. The preferred sulfenamides are those where R and R' taken individually are hydrogen, or alkyl or cycloalkyl of 1–10 carbons, e.g., alkyl of 1–10 carbons, or cycloalkyl or alkylcycloalkyl of 5–10 carbons, and R and R' taken together are as defined above.

The products of this invention are prepared by a one- or two-step process as follows:

The product of the above Formula I where Y is the sulfenyl chloride group, —SCl, i.e., 4-chloroisothiazolo [4,5,d]-3-isothiazolesulfenyl chloride, is prepared by reacting chlorine with an alkali metal salt, preferably a sodium or potassium salt, of 3,5-dimercapto-4-isothiazole-carbonitrile, the mole ratio of chlorine to alkali metal salt used being at least 2:1. This reaction is represented by the equation (1) 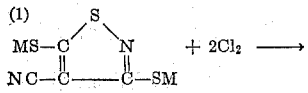
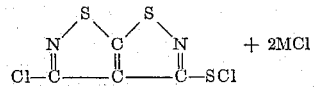

where M is an alkali metal cation.

The products of Formula I where Y is a sulfenamido group

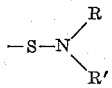

i.e., the 4-chloroisothiazolo[4,5,d]-3-isothiazolesulfenamides, are prepared in a second step in which the sulfenyl chloride of the first step is reacted with an amine reactant

where R and R' have the previously stated significance (i.e., the amine reactant is ammonia or a primary or secondary amine), the amine reactant being used in a mole ratio not exceeding 3:1 and preferably of approximately 2:1 with respect to the sulfenyl chloride reactant. This reaction is represented by the equation (2) 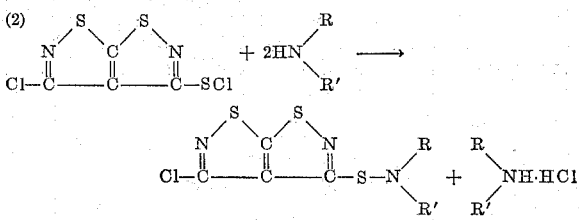

The preparation of 4-chloroisothiazolo[4,5,d]-3-isothiazolesulfenyl chloride, i.e., step (1) of the above-described process, is carried out simply by bringing in contact chlorine and the alkali metal salt of 3,5-dimercapto-4-isothiazolecarbonitrile in a mole ratio of at least 2:1 and preferably in excess thereover. The reaction proceeds rapidly. Also, it is exothermic and can, therefore, take place at a low external temperature, for example, of the order of —20° C. The reaction temperature is not critical, but it is preferred to adjust the operating conditions, using external cooling if necessary, so that the temperature of the reaction mixture does not exceed about 100° C. The reaction is conveniently conducted in an organic liquid medium which dissolves at least the chlorine reactant to at least some extent, e.g., 1% by weight, and is not appreciably reactive towards the reactants and reaction product at the operating temperature. For this purpose, organic solvents free of active hydrogen (i.e., hydrogen attached to an element other than carbon) are suitable. Examples of such reaction media include aromatic hydrocarbons such as benzene or toluene; halogenated hydrocarbons such as carbon tetrachloride, tetrachloroethylene or chlorobenzene; ethers such as di-n-butyl ether, 1,2-dimethoxyethane, 1,2-diethoxyethane, dioxane or tetrahydrofuran; low-melting sulfones such as tetramethylene cyclic sulfone; and the like. The amount of liquid diluent is immaterial provided it is sufficient to maintain the solid reactants and reaction products in partial solution or suspension.

The resulting 4-chloroisothiazolo[4,5,d]-3-isothiazole-sulfenyl chloride, a crystalline solid, is recovered from the reactional mixture by any appropriate conventional means. Most conveniently, the alkali metal chloride is removed by filtration and the reaction product is crystallized from the filtrate, with or without prior concentration. Alternatively, the solvent is evaporated and the residue extracted with a solvent for the organic reaction product. However, it is not essential to isolate the 4-chloroisothiazolo[4,5,d]-3-isothiazolesulfenyl chloride since the second step of the process can be carried out by adding the amine reactant directly to the reaction mixture as obtained in the first step, preferably after removing the insoluble materials by filtration and boiling off the excess chlorine, if any.

In step (2) of the process of this invention, 4-chloroisothiazolo[4,5,d]-3-isothiazolesulfenyl chloride, is reacted with amonia or a primary or secondary amine, i.e., a compound of formula

where R and R', including the preferred embodiments thereof, are as previously defined in connection with the reaction products. In this reaction the chlorine atom of the sulfenyl chloride group is replaced by the

group with formation of a sulfenamido group. The chlorine atom in the 4-position remains unaffected, provided the mole ratio of the amine reactant to the sulfenyl chloride reactant does not appreciably exceed 2:1. If this 2:1 ratio is exceeded by a significant amount, a competitive reaction takes place to some extent, involving opening of the 4-chloroisothiazolo portion of the molecule with formation of a 4-cyanoisothiazole-3,5,-bis-sulfenamide, i.e., a compound of the formula

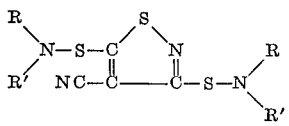

For this reason, it is generally preferred that the amine reactant be used in approximately the stoichiometric amount required by Equation 2 above, e.g., in a molar ratio with respect to the sulfenyl chloride between about 1.8:1 and 2.2:1, when it is desired to obtain the 4-chloroisothiazolo[4,5,d]-3-isothiazolesulfenamide essentially free from 4-cyanoisothiazole-3,5-bis-sulfenamide, thus avoiding subsequent separation of the two compounds. However, this is by no means essential since useful amounts of the first named compound are obtained, in admixture with the second named compound, even when the 2:1 mole ratio is substantially exceeded. In practice, it is entirely feasible to use a mole ratio of amine reactant to sulfenyl chloride between about 1.8:1 and 3:1. The mixture of reaction products obtained at the higher ratio can, if desired, be separated into its components by fractional crystallization since the two products differ in solubilities and melting points. Such a separation is unnecessary, however, for at least one important practical application of the products of this invention, viz, their use as rubber vulcanization accelerators, since both the 4-chloroisothiazolo[4,5,d]-3-isothiazolesulfenamides and the 4-cyanisothiazole-3,5-bis-sulfenamides are very effective for this purpose.

The reaction conditions in step (2) are not critical. Since the reaction is rapid and exothermic, it can take place at a low external temperature, e.g., of the order of −20° C. The temperature of the reaction mixture can be controlled by external cooling, if necessary. In general, a satisfactory temperature range is that between 0 and 30° C. Heat may be applied if desired but there is no advantage in exceeding about 100° C. The reaction is conveniently conducted in an organic liquid medium capable of dissolving the reactants to at least some extent, e.g., 1% by weight. Any organic solvent which is not appreciably reactive towards the reactants and reaction product can be used. Solvents free from active hydrogen are suitable, such as those already mentioned in connection with step (1) of the process. Closed vessels can be used with highly volatile amine reactants, if necessary.

The resulting 4-chloroisothiazolo[4,5,d]-3-isothiazolesulfenamides are crystalline solids which can be separated from the reaction mixture by any appropriate means. A convenient procedure consists in removing the amine hydrochloride by filtration and crystallizing the 4-chloroisothiazolo[4,5,d]-3-isothiazolesulfenamide from the filtrate, with or without first concentrating the latter.

The invention is illustrated by the following examples. The preparation of the starting material used in step (1) of the process is also described below.

EXAMPLE I

*4-chloroisothiazolo[4,5,d]-3-isothiazolesulfenyl chloride*

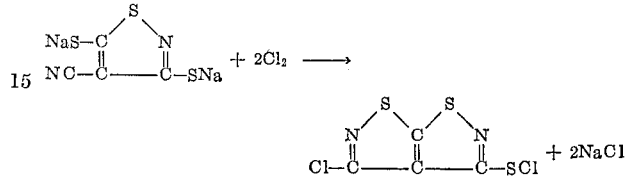

A vigorous stream of chlorine gas was passed into a stirred slurry of 10 g. (0.046 mole) of dry 3,5-disodiomercapto-4-isothiazolecarbonitrile in 200 ml. of distilled carbon tetrachloride for two hours while the reaction mixture was maintained at reflux temperature, at first by the heat of the reaction and later by the application of heat. The hot reaction mixture was filtered to remove the sodium chloride. On cooling the filtrate to 0° C. there was obtained 5.9 g. of a precipitate of 4-chloroisothiazolo[4,5,d]-3-isothiazolesulfenyl chloride as yellow needles melting at 147–149° C. A second crop of 0.7 g. (total yield 59%) was obtained by concentration of the mother liquor.

*Analysis.*—Calc'd for $C_4Cl_2N_2S_3$: Cl, 29.16; S, 39.57. Found: Cl, 28.12; S, 39.10.

Ultraviolet: $\lambda_{max.}$ in ethanol: 268 m$\mu$ ($\epsilon$=6760), 232 m$\mu$ ($\epsilon$=16,300).

Infrared: 6.85$\mu$, 7.35$\mu$, 8.55$\mu$, 10.55$\mu$, 13.15$\mu$.

The starting material in this example, 3,5-disodiomercapto - 4 - isothiazolecarbonitrile, can be prepared by sulfurization of 2,2 - dicyano - 1,1 - disodiomercaptoethylene in accordance with the equation

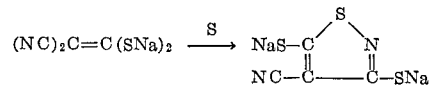

A typical preparation of the disodium derivative is described below. The dipotassium derivative is equally suitable and can be prepared in a similar manner.

A mixture of 16.0 g. of 2,2 - dicyano - 1,1 - disodiomercaptoethylene, 200 ml. of methanol and 2.9 g. of sulfur was heated under reflux for 30 minutes and then filtered from a little insoluble material and evaporated to dryness at reduced pressure. The residue was taken up in 100 ml. of hot 95% ethyl alcohol, and the solution was cooled and diluted with ethyl acetate and ethyl ether to precipitate the tetrahydrate of 3,5 - disodiomercapto-4-isothiazolecarbonitrile as a crystalline solid. The product, collected in three fractions, weighed 18.9 g. after drying in air.

Drying in a vacuum oven at 80° C. and 1 mm. of mercury pressure in the presence of phosphoric anhydride gave the anhydrous 3,5 - disodiomercapto - 4 - isothiazolecarbonitrile.

*Analysis.*—Calc'd for $C_4N_2S_3Na_2$: C, 22.02; N, 12.84; S, 44.08. Found: C, 22.29; N, 12.70; S, 42.83.

The 2,2 - dicyano - 1,1 - disodiomercaptoethylene used in the above preparation may be prepared and isolated by the following modification of the procedure described in U.S. Patent 2,533,233:

Malononitrile (66 g., 1 mole) was added slowly to a suspension of 80 g. (2 moles) of sodium hydroxide in 900 ml. of 95% alcohol while the temperature of the mixture was maintained below 40° C. Then carbon disulfide (76 g., 1 mole) was added dropwise with cooling over a period of 30 minutes. The heavy, yellow slurry was stirred an additional hour at room temperature and filtered. The yellow residue was triturated in alcohol, collected on a filter and dried in a vacuum oven at 80° C./1 mm. for 24 hours. There was obtained 180 g. (98% yield) of 2,2 - dicyano - 1,1 - disodiomercaptoethylene.

EXAMPLE II

*4-chloroisothiazolo[4,5,d]-3-isothiazolesulfenylmorpholine*

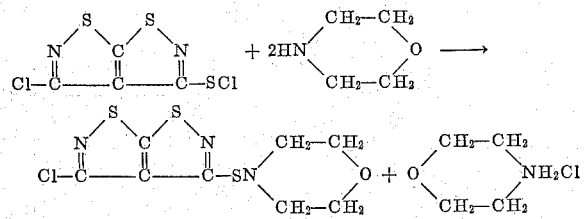

To a solution of 4.86 g. (0.02 mole) of 4-chloroisothiazolo[4,5,d] - 3 - isothiazolefenyl chloride in 100 ml. of tetrahydrofuran at room temperature was added 3.48 g. (0.04 mole) of morpholine over a period of 15 minutes. The mixture was stirred 30 minutes at room temperature and the morpholine hydrochloride which had precipitated (2.43 g.) was removed by filtration. Evaporation of the filtrate gave 5.5 g. (94% yield) of a yellow solid residue of 4 - chloroisothiazolo[4,5,d] - 3 - isothiazolesulfenylmorpholine which, after recrystallization from carbon tetrachloride and then from ethyl ether, melted at 165–167° C. (instantaneous melting point).

*Analysis.*—Calc'd for $C_8H_8ClN_3OS_3$: C, 32.60; H, 2.75; N, 14.31. Found: C, 32.75; H, 2.79; N, 14.47.

Ultraviolet: $\lambda_{max}$ in $CH_2Cl_2$, 277 m$\mu$ ($\epsilon$=7030), 238 m$\mu$ ($\epsilon$=14,800).

Infrared: 3.38$\mu$, 3.43$\mu$ and 3.49$\mu$ (sat. C—H), 6.90$\mu$, 8.6$\mu$, 9.08$\mu$, 10.65$\mu$.

This compound was effective as a vulcanization accelerator when tested on both natural rubber and synthetic rubber (25/75 styrene/butadiene copolymer).

EXAMPLE III

*N-t-butyl 4-chloroisothiazolo[4,5,d]-3-isothiazolesulfenamide*

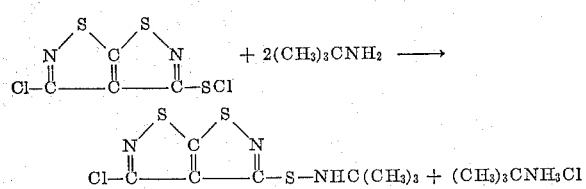

To a solution of 24.3 g. (0.10 mole) of 4-chloroisothiazolo[4,5,d]-3-isothiazolesulfenyl chloride in 450 ml. of benzene and 100 ml. of tetrahydrofuran was added over a period of 30 minutes a solution of 14.3 g. (0.20 mole) of t-butylamine in 25 ml. of benzene while maintaining the temperature of 0–5° C. After stirring for one hour at room temperature, the mixture was filtered to remove the amine hydrochloride and the filtrate was concentrated by evaporation at 40–45° C. under reduced pressure. The crystalline residue weighed 25 g. A 15 g. portion of this residue was extracted with petroleum ether in a Soxhlet apparatus, and from the liquid extract there crystallized 4.9 g. of N-t-butyl 4-chloroisothiazolo[4,5,d]-3-isothiazolesulfenamide as light yellow needles, M.P. 130° C. An additional 1.5 g., M.P. 126–128.5° C., was obtained as a second crop.

*Analysis.*—Calc'd for $C_8H_{10}ClN_3S_3$: C, 34.34; H, 3.60; N, 15.02. Found: C, 34.42; H, 3.50; N, 14.68.

The infrared spectrum indicated the absence of the nitrile group and the presence of the NH group.

This compound was effective as a vulcanization accelerator when tested on synthetic rubber (25/75 styrene/butadiene copolymer).

While the invention has been illustrated in the foregoing examples with reference to certain specific reactants and reaction products, it is, of course, not limited thereto. Thus, by applying the procedure of Examples II and III to different amine reactants, other 4-chloroisothiazolo [4,5,d]-3-isothiazolesulfenamides of formula

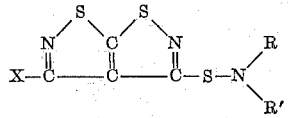

can be obtained. Additional examples of these products are shown in the table below where, for the sake of brevity, only the name of the amine reactant and the formula of the

group are given.

| Amine Reactant | $-N\begin{smallmatrix}R\\R'\end{smallmatrix}$ Group |
|---|---|
| Ammonia | —NH$_2$ |
| Methylamine | —NHCH$_3$ |
| Diethylamine | —N(C$_2$H$_5$)$_2$ |
| Isopropylamine | —NHCH(CH$_3$)$_2$ |
| n-Hexylamine | —NH(CH$_2$)$_5$CH$_3$ |
| Ethyl(n-hexyl)amine | —N(C$_2$H$_5$)((CH$_2$)$_5$CH$_3$) |
| n-Octylamine | —NH(CH$_2$)$_7$CH$_3$ |
| Di-n-octylamine | —N[(CH$_2$)$_7$CH$_3$]$_2$ |
| n-Decylamine | —NH(CH$_2$)$_9$CH$_3$ |
| Cyclopentylamine | —NH—cyclopentyl |
| Cyclohexylamine | —NH—cyclohexyl |
| 2,6-Diethylcyclohexylamine | —NH—(2,6-diethylcyclohexyl) |
| 2-Decahydronaphthylamine | —NH—(2-decahydronaphthyl) |
| Ethylenimine | —N(CH$_2$CH$_2$) (aziridinyl) |
| 2-Ethylethylenimine | —N(CH(C$_2$H$_5$)CH$_2$) |
| Pyrrolidine | —N(CH$_2$CH$_2$CH$_2$CH$_2$) (pyrrolidinyl) |
| 2-Methylpyrrolidine | —N(CH(CH$_3$)CH$_2$CH$_2$CH$_2$) |

| Amine Reactant | —N(R)(R') Group |
|---|---|
| Piperidine | —N(CH₂—CH₂)₂CH₂ (piperidino ring) |
| 2,6-Diethylpiperidine | —N with CH(C₂H₅)—CH₂—CH₂—CH(C₂H₅) and bridging CH₂ |
| Hexamethylenimine | —N(CH₂—CH₂—CH₂)₂ |
| 2,6-Dimethylmorpholine | —N(CH(CH₃)—CH₂)₂O |
| Thiamorpholine | —N(CH₂—CH₂)₂S |
| 3,5-Dimethylthiamorpholine | —N(CH₂—CH(CH₃))₂S |

As has been shown, the 4-chloroisothiazolo[4,5,d]-3-isothiazolesulfenyl chloride of this invention is useful as intermediate in the preparation of the 4-chloroisothiazolo[4,5,d]-3-isothiazolesulfenamides. The latter are, as a class, effective accelerators of the vulcanization of natural and synthetic rubbers. This is illustrated in Examples II and III where the results of standard tests are summarized. These tests involved determination of Mooney scorch (ASTM Method D1646-59T) and stress-strain data as determined by the Scott machine (ASTM Method D412-51T).

Since obvious modifications and equivalents in the invention will be apparent to those skilled in the chemical arts, I propose to be bound solely by the appended claims.

The embodiments of the invention in which an exclusive property or privilege is claimed are defined as follows:

1. A compound of the formula:

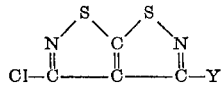

where Y is a member of the group consisting of —SCl and —SN(R)R'; each of R and R' taken individually is a member of the group consisting of hydrogen, alkyl of 1 to 10 carbons, and cycloalkyl of 5 to 10 carbons; and R and R' taken together are an alkylene group of 2–6 chain carbons bearing a total of up to 2 alkyl substituents of 1–2 carbons; and R and R' taken together with N are a member of the group consisting of morpholino, thiamorpholino and substituted morpholino and thiamorpholino where the substitutents, which are 1–2 alkyl groups of 1–2 carbons, are bonded to carbon.

2. 4 - chloroisothiazolo[4,5,d] - 3-isothiazolesulfenyl chloride.

3. 4 - chloroisothiazolo[4,5,d] - 3-isothiazoloesulfenyl-morpholine.

4. N - t - butyl-4-chloroisothiazolo[4,5,d]-3-isothiazolesulfenamide.

5. The process which comprises (1) contacting, in an organic solvent free of active hydrogen and at a temperature of up to 100° C., chlorine with a bis-alkali metal salt of 3,5-dimercapto-4-isothiazolecarbonitrile, the molar ratio of chlorine to bis alkali metal salt being at least 2:1, thereby preparing 4 - chloroisothiazolo[4,5,d] - 3-isothiazolesulfenyl chloride and (2) contacting, in an organic solvent free of active hydrogen and at a temperature of up to 100° C., said sulfenyl chloride with an amine of the formula HN(R)R', where each of R and R' taken individually is a member of the group consisting of hydrogen, alkyl of 1 to 10 carbons and cycloalkyl of 5 to 10 carbons, R and R' taken together are alkylene of 2–6 chain carbons bearing a total of up to 2 alkyl substituents of 1–2 carbons, and R and R' taken together with N are a member of the group consisting of morpholino, thiamorpholino and substituted morpholino and thiamorpholino where the substituents, which are 1–2 alkyl groups of 1–2 carbons, are bonded to carbon, and the molar ratio of amine to sulfenyl chloride not exceeding 3:1, thereby preparing a 4 - chloroisothiazolo[4,5,d] - 2-isothiazolesulfenamide.

6. The process of preparing 4 - chloroisothiazolo[4,5,d]-3-isothiazolesulfenyl chloride which comprises contacting, in an organic solvent free of active hydrogen and at a temperature of up to 100° C., two moles of chlorine with one mole of a bis alkali metal salt of 3,5-dimercapto-4-isothiazolecarbonitrile.

7. The process of preparing a compound of the formula:

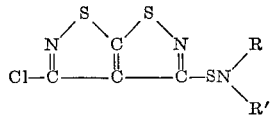

which comprises contacting, in an organic solvent free of active hydrogen and at a temperature of up to 100° C., one mole of 4-chloroisothiazolo[4,5,d]-3-isothiazolesulfenyl chloride with two moles of an amine of the formula HN(R)R', where each of R and R' taken individually is a member of the group consisting of hydrogen, alkyl of 1 to 10 carbons and cycloalkyl of 5 to 10 carbons, R and R' taken together are a member of alkylene of 2–6 chain carbons bearing a total of up to 2 alkyl substituents of 1–2 carbons, and R and R' taken together with N are a member of the group consisting of morpholino, thiamorpholino and substituted morpholino and thiamorpholino where the substituents, which are 1–2 alkyl groups of 1–2 carbons, are bonded to carbon.

References Cited by the Examiner

UNITED STATES PATENTS 2,719,125  9/1955  Roberts _____ 260—302
3,020,287  2/1962  Smith _____ 260—302

NICHOLAS S. RIZZO, *Primary Examiner.*

UNITED STATES PATENT OFFICE
CERTIFICATE OF CORRECTION

Patent No. 3,232,935　　　　　　　　　　　　　　February 1, 1966

William R. Hatchard

It is hereby certified that error appears in the above numbered patent requiring correction and that the said Letters Patent should read as corrected below.

Column 2, line 61, for "reactional" read -- reaction --; column 8, line 31, for "a4-chloroisothiazolo[4,5,d]-2-isothiazolesul-" read -- a 4-chloroisothiazolo[4,5,d]-3-isothiazolesul- --.

Signed and sealed this 17th day of January 1967.

(SEAL)

Attest:

ERNEST W. SWIDER
Attesting Officer

EDWARD J. BRENNER
Commissioner of Patents